Aug. 18, 1931.  R. S. SANFORD  1,819,846
BRAKE OPERATING MECHANISM
Filed Nov. 1, 1926  2 Sheets-Sheet 1

INVENTOR
ROY S. SANFORD
BY
ATTORNEY

Aug. 18, 1931.  R. S. SANFORD  1,819,846
BRAKE OPERATING MECHANISM
Filed Nov. 1, 1926    2 Sheets-Sheet 2

INVENTOR
ROY S. SANFORD
BY
ATTORNEY

Patented Aug. 18, 1931

1,819,846

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

BRAKE-OPERATING MECHANISM

Application filed November 1, 1926. Serial No. 145,448.

This invention relates to brakes and is illustrated as embodied in novel operating mechanism for a brake on a front or other swivelled wheel. An object of the invention is to provide a brake-applying device such as a wedge which is movable in applying the brake substantially parallel to the axis of the wheel by connections including a universal joint which is arranged when the brake is applied immediately adjacent the swivelling axis of the wheel so that swivelling of the wheel in steering is not appreciably interfered with.

An important feature of novelty relates to arranging the parts of a brake-operating mechanism such as described above in such a manner that the pressure on the brake is automatically varied when the wheel is swivelled to round a corner, preferably by relieving the pressure on the brake which is on the outside of the turn. As fully explained below, this can be accomplished by arranging the universal joint mentioned above slightly at one side of the swivelling axis of the wheel and in a particular relation thereto.

Other objects and features of the invention, including various novel and desirable details of construction, will be apparent from the following description of one illustrative embodiment shown in the accompanying drawings, in which.

Figure 1:
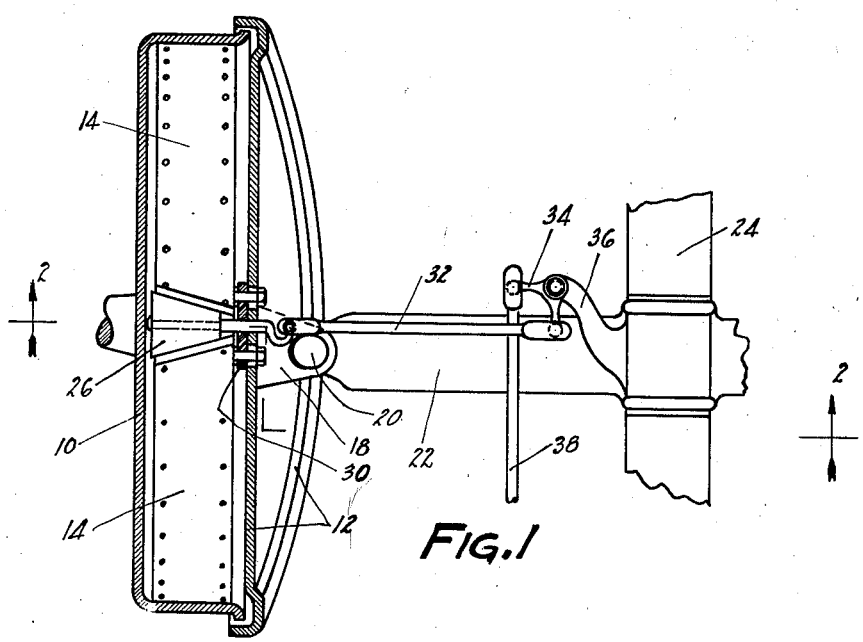
Figure 1 is a horizontal section through the brake-operating means taken in such a manner as to show the brake shoes in top plan view.
Figure 2:
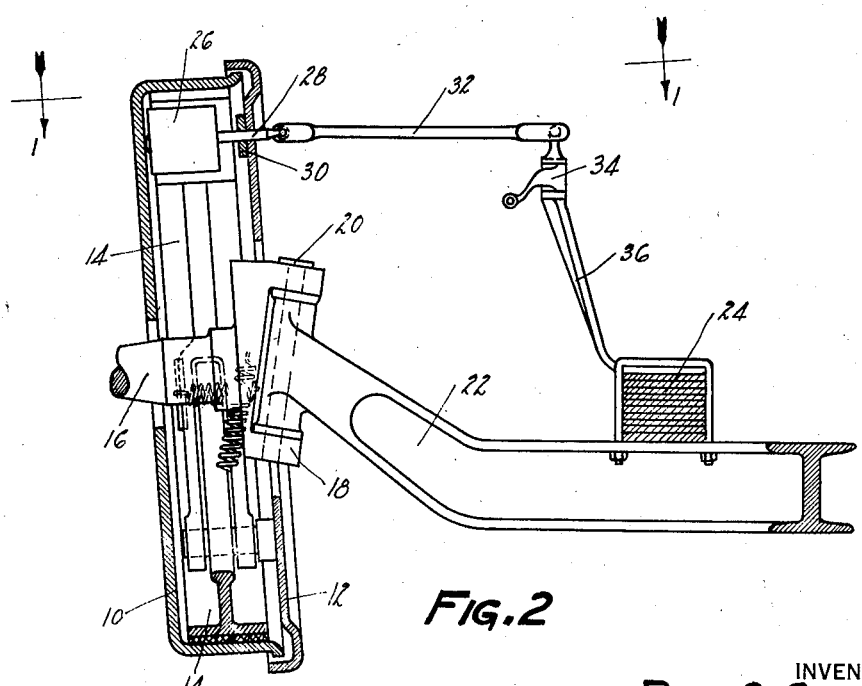
Figure 2 is a vertical section through the brake and its operating means substantially on the line 2—2 of Figure 1.

In the arrangement illustrated, the brake includes a rotatable drum 10, at the open side of which is arranged a suitable backing plate 12, and within which is arranged friction means such as brake shoes 14. Except as further described below, the brake may, if desired, be substantially as fully described in Patent No. 1,567,716, issued December 29, 1925, to Bendix Brake Company, on an application of A. Y. Dodge. The drum 10 is arranged to rotate with a wheel (not shown) mounted on the spindle 16 of a knuckle 18 connected by a king-pin 20 or the like at one end of a front axle 22 having the usual chassis supporting springs 24. The present invention relates to the means for applying the brake.

In the arrangement illustrated, the device for applying the brake includes a wedge member 26 carried by a plunger 28, slidably mounted in a bracket 30 frictionally clamped to the backing plate 12, and movable lengthwise in applying the brake away from the wheel in a direction substantially parallel to the axis of the wheel. I prefer to operate the plunger 28 by connecting it through a ball-and-socket joint or other universal joint to one end of a link 32 which is moved lengthwise in applying the brake by a bell-crank lever 34 fulcrumed on a bracket 36 formed as an extension of the spring pad of spring 24 and connected to the usual brake-operating mechanism by a pull rod or cable 38. In order to facilitate the use of a universal ball joint, the end of plunger 28 may be in the shape of a hook, as shown in Figure 1, so that the stem carrying the ball may extend at a right angle to link 32. It will be observed that the universal joint connecting the plunger 28 to the link 32 is arranged with the brake applied in or immediately adjacent the axis of the king-pin 20, i. e., the swivelling axis of the wheel, so that the brake-operating mechanism will not interfere with the swivelling of the wheel in steering.

Figure 3:
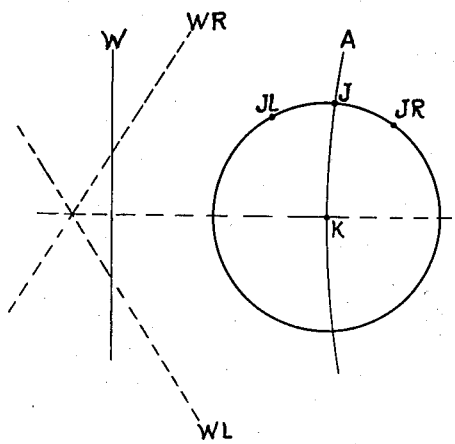
Figures 3, 4, and 5 are diagrams corresponding to top plan views and illustrating the manner of varying the pressure in rounding a corner.
Figure 4:
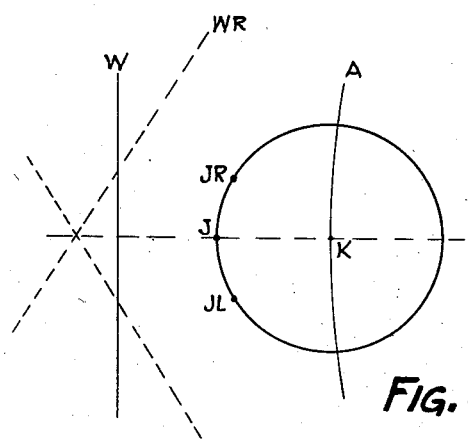
Figure 5:
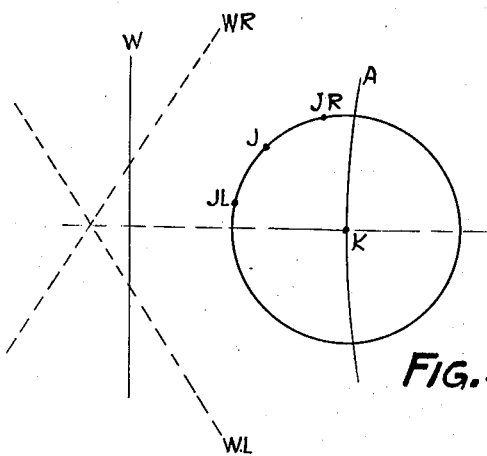

In the diagrams of Figures 3, 4, and 5 are shown arrangements for varying the pressure on the brake in rounding a corner, preferably by relieving the pressure on the outer brake to prevent any possibility of locking the outer wheel which might cause loss of steering control of the car.

In each of these diagrams the swivelling axis of the wheel is indicated at "K", the wheel in the straight-ahead position is indicated by the line "W", the wheel swivelled to turn a corner to the right is indicated by the line "WR", and the wheel when swivelled to turn a corner to the left is indicated by the line "WL". Each of the diagrams indicates the parts at the left front wheel with the front of the automobile at the top of the figure. In each of the figures the arc "A" is an arc through the swivelling axis "K" parallel to the path of movement of the outer end of the link 32 if its inner end is held. The points "J" indicate the position of the universal joint between plunger 28 and link 32 with the brake applied, when the wheel is in the position "W", the points "JR" indicate the position of this joint when the wheel is in the position "WR", and the points "JL" indicate the position of the joint when the wheel is in the position "WL".

In the arrangement of Figure 3, the joint "J" with the brake applied and with the wheel straight ahead in the position "W" is directly in front of the swivelling axis "K"; that is, it is on the arc "A". It will be observed that, if the wedge 26 and plunger 28 are held against movement and the wheel is swivelled to the position "WR" to place it on the outside of a turn, the joint "J" moves to the position "JR", relaxing the tension on the link 32. What actually happens, of course, is that the tension is somewhat relaxed and the plunger 28 is allowed to move slightly outward to decrease the pressure on the brake. Similarly, when the wheel is swivelled to the position "WL" to place it on the inside of a turn, the joint "J" tends to move to the position "JL", increasing the tension on link 32 and applying additional force to the brake.

In the arrangement of Figure 4, the joint "J" is arranged when the brake is applied on the side of the swivelling axis "K" next the wheel and substantially on a line through the axis "K" perpendicular to the wheel. It will be seen that in this arrangement swivelling the wheel to "WR" tends to move the joint to a position "JR" and that swivelling the wheel to a position "WL" tends to move the joint to the position "JL", both of which positions are closer to the arc "A" than is the position "J", so that swivelling the wheel in either direction relaxes the tension on the link 32 and relieves the pressure on the brake.

I prefer to arrange the parts according to the diagram of Figure 5 and have so shown them in Figure 1. In this arrangement the joint "J" when the brake is applied is approximately midway between the positions of Figure 3 and Figure 4; that is it is on the side of the swivelling axis "K" next the wheel and also in the front of the swivelling axis "K", the line "JK" being at an angle of approximately 45 degrees to a line through the swivelling axis "A" perpendicular to the wheel. It will be seen that when the wheel is swivelled to the position "WR" to place it on the outside of a turn the joint "J" tends to move to the position "JR", giving a very considerable increment of movement in a direction to relax the tension on link 32 and relieve the pressure on the brake, whereas when the wheel is swivelled to the position "WL" to place it on the inside of a turn the joint "J" tends to move to the position "JL", the increment of movement tending to increase the tension on the link 32 and increase the pressure on the brake being very much smaller than is the releasing increment on the outer brake, on account of the fact that arc "J—JL" is much more nearly parallel to the arc "A" than is the arc "JR".

While one illustrative embodiment has been described in detail, it is not my intention to limit the scope of the invention to that particular embodiment or otherwise than by the terms of the appended claims.

I claim:

1. A vehicle having, in combination, a swivelled wheel having a brake, a brake-applying device at the top of the brake movable in applying the brake in a direction away from the wheel substantially parallel to the axis of the wheel, a non-swivelling support opposite the brake, a connection carried at one end on the support, and a universal joint between the opposite end of the connection and the brake-applying device which moves bodily crosswise of the swivelling axis and which is arranged when the brake is applied near enough the swivelling axis of the wheel not to materially interfere with swivelling the wheel.

2. A vehicle having, in combination, a swivelled wheel having a brake, a brake-applying wedge member at the top of the brake movable in applying the brake in a direction away from the wheel substantially parallel to the axis of the wheel, and brake-applying means including a universal joint which is arranged when the brake is applied outside of but at least near enough the swivelling axis of the wheel not to appreciably interfere with swivelling the wheel.

3. A vehicle having, in combination, a swivelled wheel having a brake, a brake-applying device at the top of the brake movable in applying the brake in a direction away from the wheel substantially parallel to the axis of the wheel, a non-swivelling support opposite the brake, a bell-crank lever on the support, a link movable lengthwise in applying the brake and universally jointed at one end to said lever, and a universal joint connecting the other end of the link to the brake-applying device and arranged when the brake is applied outside of the wheel and near enough the swivelling axis of the wheel not to appreciably interfere with swivelling the wheel.

4. A vehicle having, in combination, a swivelled wheel having a brake, a brake-applying device at the top of the brake movable in applying the brake in a direction away from the wheel substantially parallel to the axis of the wheel, a non-swivelling support opposite the brake, a bell-crank lever on the support, a link movable lengthwise in applying the brake and universally jointed at one end to said lever, and a universal joint connecting the other end of the link to the brake-applying device and so arranged with respect to the swivelling axis of the wheel when the brake is applied that swivelling the wheel varies the brake-applying force.

5. A vehicle having, in combination, a swivelled wheel having a brake, and a brake-applying device movable in applying the brake in a direction away from the wheel substantially parallel to the axis of the wheel and including lengthwise movable parts connected end to end and so arranged with respect to the swivelling axis of the wheel that swivelling the wheel automatically varies the brake-applying force.

6. A vehicle having, in combination, a swivelled wheel having a brake, a brake-applying device movable in applying the brake in a direction away from the wheel substantially parallel to the axis of the wheel, and tension means operating said device and including a relatively short and a relatively long part connected end to end said parts being so arranged with respect to the swivelling axis of the wheel that swivelling the wheel to place it on the outside of a turn automatically slackens the tension on said means.

7. A vehicle having, in combination, a swivelled wheel having a brake, a brake-applying device movable in applying the brake in a direction away from the wheel substantially parallel to the axis of the wheel, and tension means operating said device and including a universal joint spaced when the brake is applied a short distance in front of the swivelling axis of the wheel.

8. A vehicle having, in combination, a swivelled wheel having a brake, a brake-applying device movable in applying the brake in a direction away from the wheel substantially parallel to the axis of the wheel, and tension means operating said device and including a universal joint arranged when the brake is applied between the wheel and the swivelling axis of the wheel.

9. A vehicle having, in combination, a swivelled wheel having a brake, a brake-applying device movable in applying the brake in a direction away from the wheel substantially parallel to the axis of the wheel, and tension means operating said device and including a universal joint arranged when the brake is applied between the wheel and the swivelling axis of the wheel and spaced a short distance in front of said swivelling axis.

10. A vehicle having, in combination, a swivelled wheel having a brake, a brake-applying device movable in applying the brake in a direction away from the wheel substantially parallel to the axis of the wheel, a link connected at one end by a universal joint with said brake-applying device, which joint is located when the brake is applied above and in front of the swivelling axis of the wheel and between said swiveling axis and the wheel.

11. A vehicle having, in combination, a swivelled wheel having a brake, a brake-applying device movable in applying the brake in a direction away from the wheel substantially parallel to the axis of the wheel, and tension means operating said device and including a universal joint arranged to travel through a horizontal arc between said swiveling axis of the wheel and the wheel.

In testimony whereof, I have hereunto signed my name.

ROY S. SANFORD.